Patented July 1, 1924.

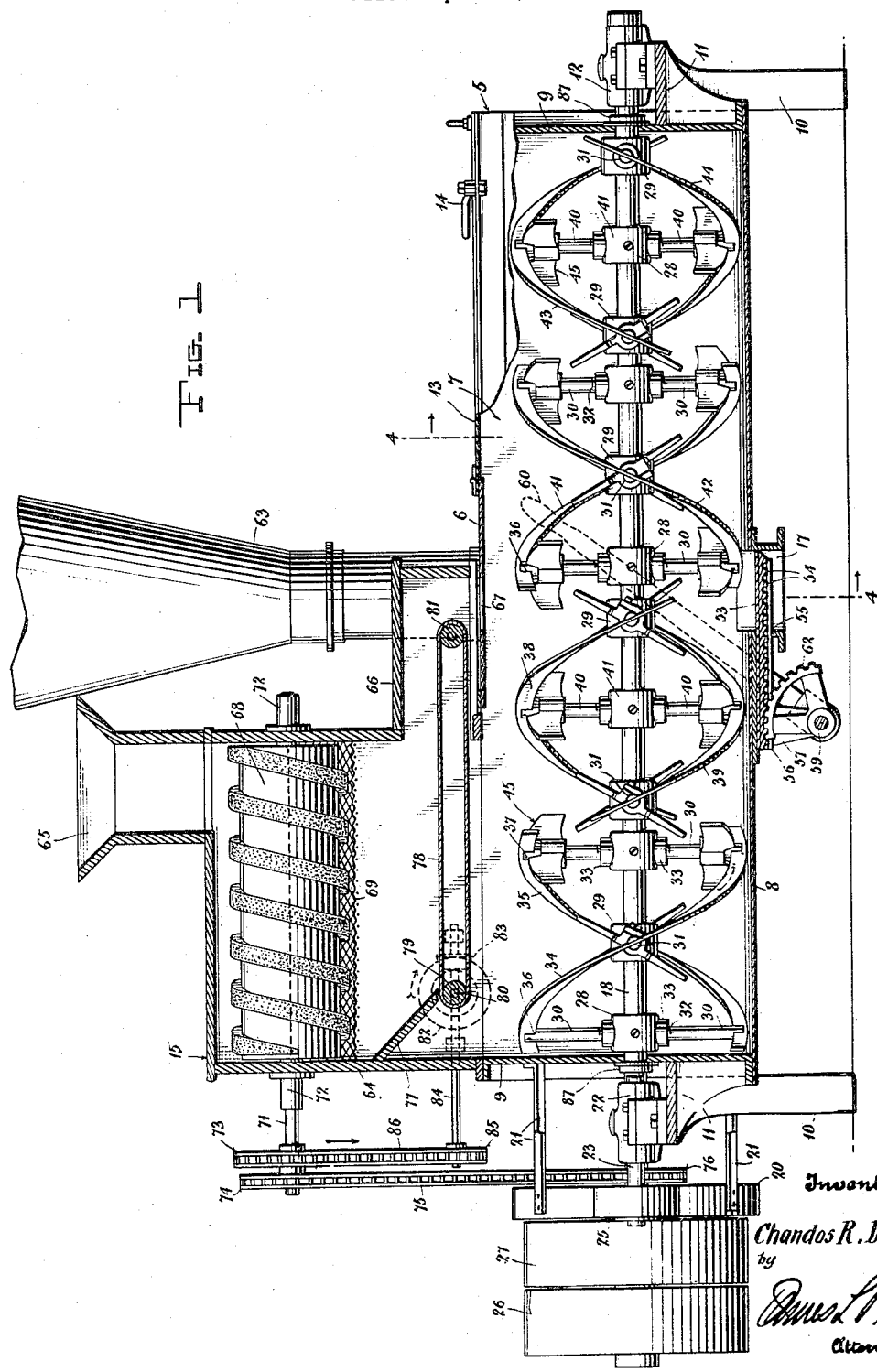

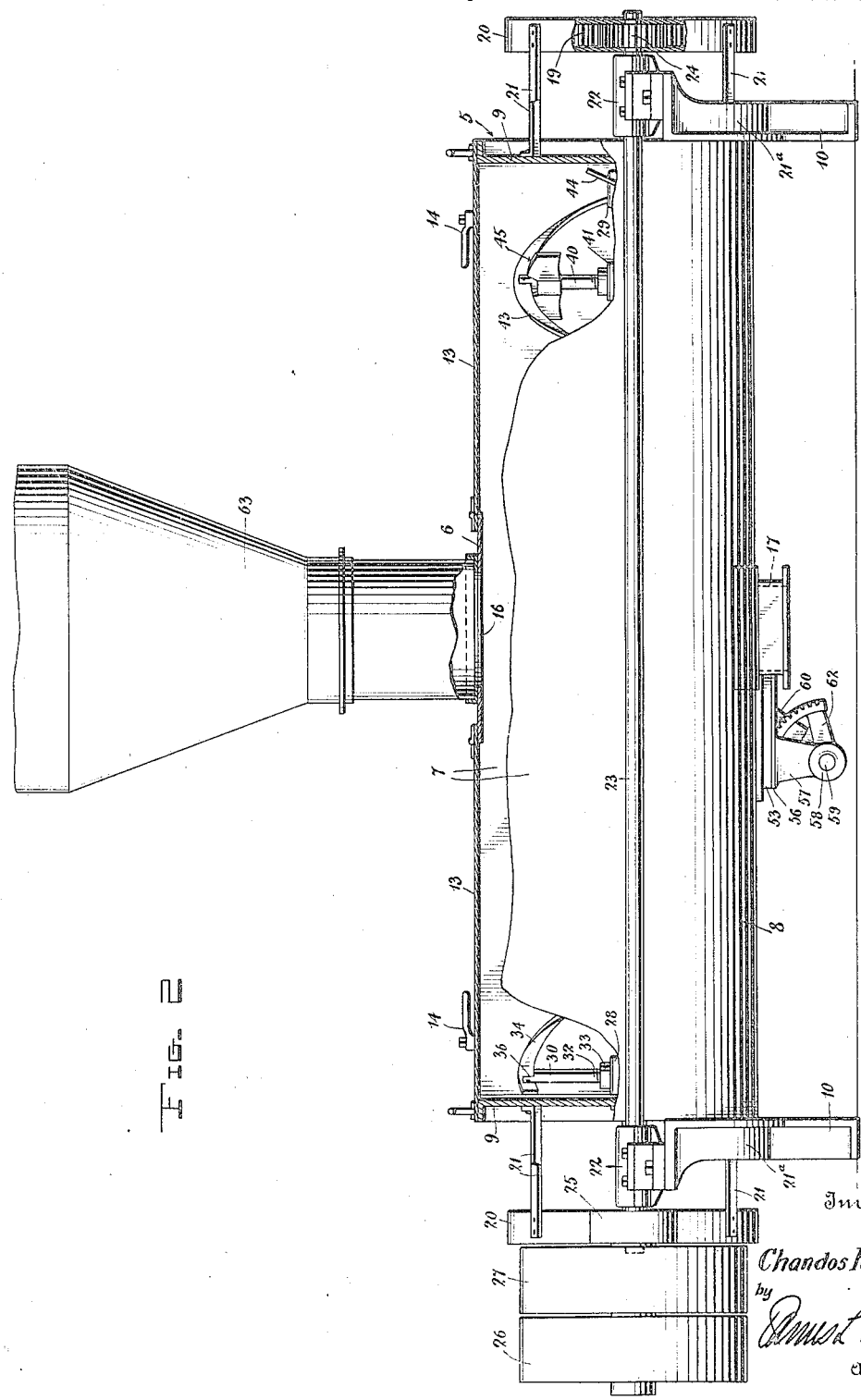

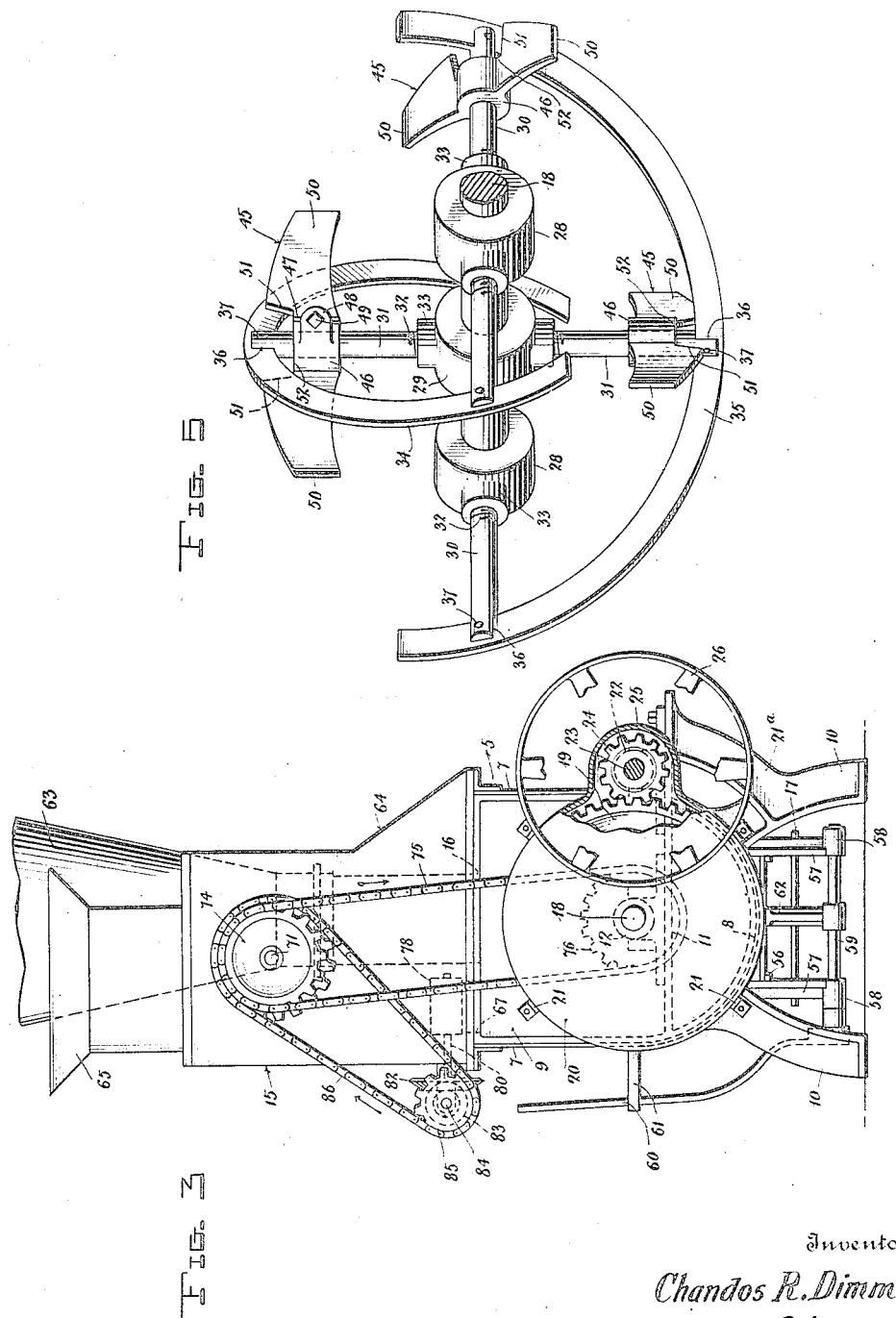

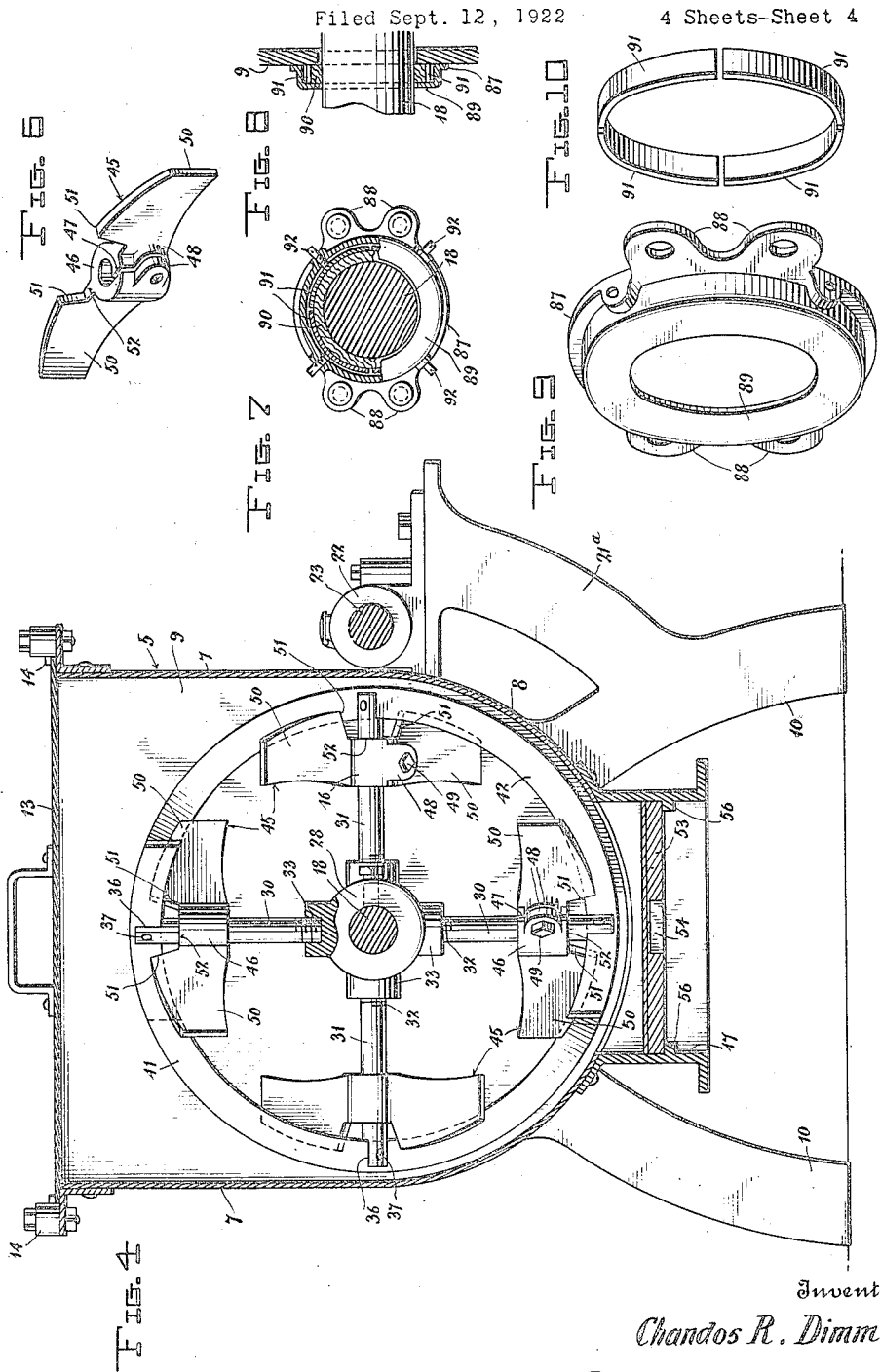

1,500,061

UNITED STATES PATENT OFFICE.

CHANDOS R. DIMM, OF MUNCY, PENNSYLVANIA, ASSIGNOR TO ROBINSON MANUFACTURING COMPANY, OF MUNCY, PENNSYLVANIA, A CORPORATION OF PENNSYLVANIA.

BATCH MIXER.

Application filed September 12, 1922. Serial No. 587,742.

*To all whom it may concern:*

Be it known that I, CHANDOS R. DIMM, a citizen of the United States, residing at Muncy, in the county of Lycoming and State of Pennsylvania, have invented certain new and useful Improvements in Batch Mixers, of which the following is a specification.

This invention relates to mixing machines commonly known as batch mixers and particularly adapted for effecting a practical commingling of various products such as flour with self-rising ingredients and also dairy and poultry feeds and other products. The improved mixing machine essentially comprises a mixing cylinder having a central inlet opening and a central discharge opening with revolving mechanism therein for thoroughly mixing the products introduced into the cylinder and also moving the mixed products regularly toward the central discharge opening. The advantage of this form of mixing cylinder is that a continuous circulation of the products introduced thereinto is effected as the products are carried from the center toward both ends of the cylinder and then back to the center. A further advantage of this operation of the improved mixing cylinder is that all ingredients enter at the center and each ingredient introduced and following the other must become thoroughly mixed with the product that is already in the cylinder or machine. This operation of the improved cylinder with its central discharge opening or outlet not only thoroughly mixes the products or ingredients that may be fed thereinto but expedites the operation by shortening the period of time necessary to carry or convey the mixed products to the central discharge opening in contradistinction to the machines of this type heretofore constructed, wherein the discharge opening or outlet is usually located at one end of the cylinder or mixing enclosure. Furthermore, by expeditiously discharging the mixed products at the center of the machine instead of at one end, as in the old type of machine, end pressure on the mixing cylinder and hard running on account of the conveying device being required to carry the material toward the end discharge are entirely eliminated, the pressure being equalized throughout the length of the mixing mechanism or device and permitting the machine to be run with considerable less power. A further specific structural feature of the improved mixing machine which is of importance is a novel arrangement and operation of the combined mixing and conveying device in the mixing cylinder, and particularly comprising both right and left-hand outer spiral ribbons which revolve and feed the products in the cylinder toward the central outlet or discharge and paddles held inside of the ribbons and at such an incline as to revolve and tend to carry the products toward the end of the cylinder in opposition to the operation of the right and left-hand spiral ribbons, and whereby a thorough commingling of the products is had and the desirable central discharge effected by the operation of the spiral ribbons tending to feed the products toward the center and overpowering the force of the paddles or blades tending to feed the products toward the ends of the cylinder.

The invention also consists in the general construction and arrangement of the several parts which will be more fully hereinafter described and claimed.

In the drawings:

Fig. 1 is a longitudinal vertical section of a mixing machine or batch mixer embodying the features of the invention and shown arranged to mix flour and self-rising ingredients;

Fig. 2 is a side elevation of the mixing cylinder partially broken away to show a portion of the interior mechanism and adapted for mixing dairy and poultry feed and other similar products;

Fig. 3 is an end elevation of the machine shown by Fig. 1 partially broken away and particularly illustrating the operating gear and shaft mechanism;

Fig. 4 is a transverse vertical section on the line 3—3, Fig. 1, looking in the direction of the arrows;

Fig. 5 is a sectional perspective view of a portion of the mixing and conveying mechanism disposed in the mixing cylinder or chamber;

Fig. 6 is a detail perspective view of one of the paddles or blades comprised in the mixing and conveying mechanism;

Fig. 7 is a front sectional elevation of one of the packing glands for the shaft of the mixing and conveying mechanism;

Fig. 8 is a longitudinal section through a part of one of the ends of the mixing chamber and showing a portion of the shaft operating the mixing and conveying mechanism having one of the packing glands applied thereto; and Figs. 9 and 10 are detail perspective views of parts of one of the packing glands on an enlarged scale.

The numeral 5 designates a mixing cylinder or enclosure which is preferably of the contour shown by Fig. 4 and having a flat top 6, partially vertical sides 7 merging into a substantially semi-circular bottom 8. The cylinder 5 has opposite ends or heads 9 of the same general contour as the sides 7 and bottom 8 and structurally reinforced as may be found necessary and also constructed for convenience and facility in assembling the same with relation to the top 6, sides 7 and bottom 8. The cylinder 5 is supported by end legs 10 with central supports 11 for bearings 12 which are located adjacent to the ends 9. As particularly shown by Fig. 2, the flat top or cover 6 is constructed with a hinged lid 13 at each end, these lids being normally held firmly closed by means of clamps 14 that can be readily released for opening the lids to give access to the interior of the cylinder for any purpose that may be desired and found necessary. In Fig. 1 one of the hinged lids 13 is shown removed to accommodate the application of sifting mechanism 15, the improved mixing machine being adapted to be used with or without the sifting mechanism, as will be more fully hereinafter explained. In the center of the flat top or cover 6 is an inlet opening 16 and in the center of the bottom 8 is a discharge or outlet opening 17, the openings 16 and 17 forming the sole means in the present improved mixing machine for the introduction of products to be treated into the cylinder and the discharge of the mixed products or other material from the cylinder. Extending longitudinally through the cylinder 5 is a shaft 18 which terminates exteriorly of the one head 9 in the adjacent bearing 12, and from the opposite head 9 the said shaft continues through the adjacent bearing 12 for application thereto of a drive gear 19, which is preferably enclosed by a casing 20 secured by connecting arms 21 to the adjacent head 9, as shown by Figs. 1 and 2. Extending upwardly from the legs 10 on one side of the cylinder 5 are bracket arms 21ª which support bearings 22 for a drive shaft 23 having a pinion 24 fixed thereto and held in continual mesh with the drive gear 19 on the shaft 18, the casing 20 being continued laterally as at 25 to enclose the pinion 24. On the shaft 23 pulleys 26 and 27 are also mounted, the one pulley being fast and the other loose, to co-operate with a suitable transmission belt from a source of power. As shown by Fig. 2, the shaft 18 is driven by the gears 19 and pinions 24 at each end to regularly and more effectively rotate the said shaft.

A simplified form of the mixing machine embodying the features of the invention consists of the cylinder 5 and the operating mechanism, including the shaft 18 which extends through the cylinder and is operated by the gear 19 and pinion 23 regularly and with such speed as may be desirable and necessary to effect a thorough circulation of the products or ingredients introduced into the cylinder 5 and to effectively commingle such products or ingredients. On the shaft 18 at predetermined intervals hubs 28 and 29 are fixed to rotate with said shaft and are respectively provided with radially projecting arms or spokes 30 and 31 which have inner screw-threaded extremities 32 to adjustably engage corresponding interior screw-threaded sockets 33 therefor, and whereby the said arms or spokes may be set as required to regularly arrange the devices connected thereto and which will now be described. Ribbon blades 34 and 35 are secured in the outer ends of the arms or spokes 30 and 31, the outer ends of the spokes being slotted as at 36 to snugly receive the ribbon blades 34 and 35, the latter being secured in these slots at the outer ends of the arms or spokes by rivets or analogous fastenings 37. As clearly shown by Fig. 1, the first ribbon blade 34 at the left continues from the set of arms or spokes 30 nearer the left end 9 of the cylinder 5 through the spokes 31, which are normally at right angles to the spokes 30, throughout the whole series of hubs 28 and 29 with arms 30 and 31 along the length of the shaft 18. From the ends of the arms or spokes 31 the ribbon blades continue to the outer ends of the next successive arms or spokes 30, and said blades are given a spiral trend or application in reverse directions on opposite sides of the shaft. From the foregoing it will be seen that the first set of blades 34 and 35 are continuous from the outermost set of arms or spokes 30 through the next set of said arms or spokes 30, where they terminate and cross the intermediate set of arms or spokes 31 which stand at right angles to the said arms or spokes 30. The ends of the succeeding sets of blades 38 and 39 are attached to and project slightly beyond the second set of arms or spokes 31 carried by the next hub 29 and continue over and are secured to the ends of arms or spokes 40 carried by a hub 41 at right angles to the arms or spokes 31 immediately in advance on the left thereof, and then said blades 38 and 39 continue over and are secured to and terminate slightly beyond a third set of the arms 39 carried by the hub 29 similar to the first two hubs 29.

This arrangement of the ribbon blades 34 and 35 and 38 and 39 is carried over a length of the shaft to a point about the center of the cylinder 5 beneath and above the inlet and discharge openings 16 and 17. From this point to the right, groups of the arms 30 carried by hubs 28 in regular spaced relation and having the hub 29 with arms 31 between them and with the said latter arms at right angles to the arms 30, are provided, such structure being a duplicate of that at the left end or extremity of the cylinder 5 and shaft 18. The third group of blades 41 and 42 to the right of the center and substantially duplications of the first group of blades 34 and 35 have trends or angular positions differing from the said first set of blades 34 and 35. The final blades 43 and 44 to the right of the blades 41 and 42 have substantially the same arrangement as the blades 38 and 39, except that the blades 43 and 44 have trends or angular positions differing from the said blades 38 and 39. The blades 43 and 44 are terminally secured to and extend slightly beyond the arms 31 of the hubs 29 at the extreme right and also continue over and are secured to the outer ends of arms 40 of the hubs 41, which are in all respects similar to the third group of arms 40, hubs 41 and arms 31 and hubs 29. In other words, a similar alternate disposition of the ribbon blades is continued throughout the length of the cylinder, the blades on the right of the vertical center of the cylinder, or from about the location of the inlet or outlet openings 16 and 17, operating to feed or convey the contents of the cylinder to the left towards the center while the blades to the left of the inlet and outlet openings 16 and 17 move the contents of the cylinder to the right. On the outer extremities of a majority of the arms 30, 31 and 40 of the several groups of these arms are auxiliary blades 45, these blades, however, being omitted from the arms 30 to the extreme left of the series of arms and also from the arms 31 to the extreme right of the group of arms. Each of the auxiliary blades 45 is of the form shown in detail by Fig. 6 and comprises a central hub 46 which is longitudinally split, as at 47, and has oppositely disposed clamping ears 48 near the inner end of the hub for the reception of a suitable clamping screw bolt 49. From the hub 46 flat wing blades 50 radially extend and are wider than the length of the hub, the inner upper portion of the blades being cut away, as at 31, to form a recess 52 for permitting the said blades to be closely applied relatively to the several ribbon blades 34, 35, 38, 39, 41, 42, 43 and 44. The auxiliary blades 45 are clamped on the arms or spokes to which they are applied diagonally with relation to the ribbon blades, and the said blades 45 to the left of the inlet and discharge openings 16 and 17 have angular positions reverse to the positions of the blades on the right of said inlet and discharge openings. The function of the blades 45 is to feed or tend to convey the products or ingredients in the mixing cylinder 5 toward the opposite ends of the latter in opposition to the operation of the ribbon blades to feed the said products or ingredients toward the center of the cylinder or chamber. The operation of the ribbon blades, however, is stronger or more forceful relatively to the products or ingredients in the cylinder 5 than the operation of the said blades 45, and hence the products or ingredients in the cylinder are moved or conveyed by the ribbon blades to the central discharge outlet 17 in opposing directions from the portions of the cylinder on opposite sides of the inlet and discharge openings 16 and 17. However, the conveying effect of the blades 45 is strong enough to result in a thorough circulation and blending of the contents of the cylinder, with obvious material advantages in mixing operations.

From the foregoing it will be seen that the mixing or blending mechanism within the cylinder 5 is of the contour of a skeleton cylinder, and the blades 45 by their respective angular dispositions add materially to the expeditious yet thorough commingling of the products or ingredients deposited in the cylinder or mixing chamber 5. When desired or found necessary the angle of the blades 45 may be modified by loosening the clamping screw bolts 49 and setting said blades in different positions and again securing them in fixed adjustment. The advantages incident to the adjustment of the arms or spokes 30, 31 and 40 is that all of the ribbon blades and the blades 45 may be regularly and uniformly positioned to render the skeleton cylinder comprising these blades symmetrical and equally effective throughout the whole length thereof.

The discharge outlet 17 is controlled as to the material liberated therethrough by means of a horizontal slide valve or gate 53 provided with rack teeth 54 and movable into and outwardly through an opening 55 in one wall of the said discharge outlet. The gate or valve 53 is held by suitable guide means 56 secured to the bottom 8 adjacent to the discharge outlet 17, and from the said bottom 8 hangers 57 depend and terminate in lower bearings 58, as shown by Fig. 3, for a rock shaft 59 extending outwardly at one side far enough to receive an operating lever 60 engaging a suitable retaining or guide means 61 projecting outwardly from one side 7 of the mixing cylinder or chamber 5. Secured to the center of the rock shaft 59 is a toothed segment 62 which is held in continual mesh with the rack or rack teeth 54 of the slide valve or gate 53, and by operating the rock shaft 59 through the lever 60 in opposite directions, the segment 62 will be correspondingly actuated and shift the valve or gate 53 in opposite directions to open, close or partially close the discharge outlet 17.

The inlet opening 16, which is in the center of the flat top or cover 6 of the cylinder 5, has a hopper 63 disposed thereover in which the products or ingredients to be treated or mixed or blended by the mechanism within the cylinder or chamber 5 are fed. In the use of the machine for blending flour, and particularly in producing self-rising flour, the flour to be treated is fed through the said hopper 63 and the self-rising ingredients through other mechanism as will now be described.

The sifting mechanism 15 is generally shown by Figs. 1 and 3 and is mounted on the flat top or cover 6. This sifting mechanism comprises a casing or enclosure 64 having an upper feed hopper 65 and an inner extension 66 which is partially disposed over an inlet opening 67 at one side of the central inlet opening 16. Within the upper portion of the casing or enclosure 64 is a rotary brush drum 68 having a portion thereof located immediately below the hopper 65 and mounted over and close to a fixed sifting screen 69 for the materials fed into the said hopper 65. The brush cylinder 68 has a shaft 71 mounted in suitable bearings 72 secured to the outer and inner walls of the casing or enclosure 64. The shaft 71 projects at one extremity and carries thereon sprocket wheels 73 and 74, the sprocket wheel 74 having a chain belt 75 trained thereover and over a sprocket wheel 76 on the shaft 18, and whereby the motion of the latter shaft is transmitted to the shaft 71 and the brush cylinder 78. At the outer end of the casing or enclosure 64 below the sifting screen 69 is a downwardly and inwardly inclined deflecting board 77 as in usual devices of this character, and below this board is an endless web carrier or belt 78 operated by a drum 79 fixed on a shaft 80 and also movable over an inner idler drum 81 partially located over the opening 67 in the flat top or cover 6 of the mixing or blending cylinder 5. The conveyor web or endless belt 78 is disposed horizontally and receives the ingredients or substances forced through the lower portion of the sifting screen 69. The shaft 80 of the drum 79 has a gear 82 on the one end thereof which projects through the side of the casing or enclosure 64, as shown by Fig. 3, the gear 82 meshing with a gear 83 on a short countershaft 84 suitably mounted at the same side of the casing or enclosure 64 and also having thereon a sprocket wheel 85 which is operatively engaged by a chain belt 86 also running over the sprocket 73 on the upper shaft 71. By the mechanism just explained the brush drum 68 and web conveyor or endless belt 78 are regularly operated, the brush drum being rotated and the conveyor actuated to cause the upper portion thereof to move inwardly towards the inlet opening 67 in the top or cover 6 of the cylinder 5. This sifting mechanism as a whole is particularly adapted to operate upon lumpy substances or ingredients which are introduced through the hopper 65 and deposited in the screen 69 and reduced or crushed by the brush cylinder 68 and forced through the lower portion of the screen 69. The crushed and sifted material or ingredient falling from the screen 69 is deposited on the conveyor web or belt 78 and by the latter carried over the inlet opening 67 and thus introduced into the mixing or blending cylinder 5. As hereinbefore indicated, when using the improved device for making self-rising flour, the self-rising ingredients or chemicals, such as soda, phosphate and salt are fed into the hopper 65 and treated by the brush drum 68 and screen 69 and conveyed by the web or endless belt 78 inwardly to the opening 67 as just explained. The flour is introduced into the cylinder 5 through the hopper 63 by way of the inlet opening 16, the inlet openings 16 and 67 being in transverse alinement and both at the center of the top or cover 6.

It is proposed in some instances to construct the improved mechanism in such manner that the sifting mechanism 15 may be readily applied and removed from the top or cover 6, and whereby the essential features of the improvement, consisting of the mixing or blending cylinder 5 and the mechanism therein, may be arranged to cooperate with different substances, or have a greater range of operation. It is also proposed to construct all of the parts of the improved device of such material as will be best adapted for the purpose, metal being used in some instances and wood of suitable character in the construction of other parts.

Another important feature of the improved mechanism is a novel form of packing gland applied against the outer side of each head 9 of the cylinder or chamber 5 around the shaft 18, to prevent leakage of the contents of the cylinder or chamber 5 at these points. This packing gland consists of a metal case 87, as shown by Figs. 7, 8 and 9, having oppositely disposed attaching ears 88 which are bolted against the head 9 around the shaft 18. This enclosing case has an outer inwardly projecting flange 89, which forms with the remaining part of the case a housing for a felt packing 90. This packing 90 is held down close against the shaft 18 to prevent any dust from blowing out around the shaft from the interior of the cylinder 5. To make this packing adjustable and to take up any wear that may ensue, four segmental iron strips 91 are mounted thereover and have adjusting screws 92 projecting through the exterior side wall of the enclosing case 87, as shown by Fig. 7, the point of each screw bearing against the center of each segmental strip or plate 91. As the felt wears, the four screws 92 may be correspondingly adjusted against the iron plate with which each co-operates to press the felt inwardly against the shaft from each quarter; and by similarly adjusting all of the screws and plates, the felt packing will be uniformly pressed closely around the shaft. In the event of excessive wear of the felt packing 90, it may very readily be replaced by a new part of the same character by first removing the case 87 from the end 9 of the cylinder or chamber 5.

The general operation of the improved mechanism as a whole is very simple and will be readily understood from the foregoing description. The products or ingredients introduced into the cylinder 5 solely by the inlet opening 16, or by both the latter opening and the inlet opening 67, will be immediately set into circulation by the spiral ribbon blades in reverse positions at opposite portions of the interior of the cylinder 5 and also by the blades 45 likewise having corresponding differentiating arrangement in the opposite parts of the cylinder relatively to the inlet and discharge openings. After being subjected to treatment for the requisite period, which may be determined by practice and in accordance with the character of the products treated, the mixed or blended products or ingredients will be discharged through the outlet 17, the latter being maintained in closed condition until a thorough mixture ensues.

What is claimed as new is:

1. A mixing machine having a cylinder with inlet means and a single outlet located at a distance from the cylinder ends, and mixing mechanism comprising radial blades and peripheral ribbon blades in the cylinder having a reverse disposition and operable to uniformly convey the contents of the cylinder towards opposite ends of the latter and also inwardly to said outlet from opposite ends of the cylinder.

2. In a mixing machine, a mixing cylinder having a centrally located discharge outlet and central inlet means in opposite portions thereof, and combined mixing mechanism in the cylinder comprising radial blades and peripheral ribbon blades reversely disposed on opposite sides of the inlet and outlet to produce a thorough mixture and for uniformly conveying the mixed contents of the cylinder to the central discharge outlet from opposite ends of the cylinder.

3. In a mixing machine, a mixing cylinder with inlet means and a single outlet both located at a distance from the cylinder ends, and mixing mechanism rotatably mounted in the cylinder and comprising a longitudinal shaft having radial arms arranged alternately in planes at right angles to each other with ribbon blades secured to the outer extremities thereof and angularly intersected by flat blades also secured to the outer portions of the said arms, the said mixing mechanism on opposite sides of the inlet and outlet of the cylinder having a reverse disposition and operable to uniformly convey the contents of the cylinder towards the opposite ends of the latter and also inwardly to said outlet from opposite ends of the cylinder.

4. In a mixing machine, a mixing cylinder having a centrally located inlet and discharge outlet respectively at the upper and lower portions thereof, and combined mixing mechanism in the cylinder comprising a longitudinal shaft having radial arms extending outwardly therefrom and alternately in planes at right angles thereto and provided with mixing and conveying components, said components consisting of outer sectional ribbon blades crossing and secured to the outer ends of the arms and intersected at right angles by auxiliary flat blades also secured to the arms, the ribbon blades being curved inwardly at their extremities and having a spiral contour, the said components on opposite sides of the outlet being reversely arranged and the ribbon blades operating to uniformly convey the contents of the cylinder from the opposite ends of the latter inwardly towards the said outlet.

5. A mixing mechanism having a cylinder with inlet means and a single centrally located outlet in the bottom thereof, and mixing mechanism rotatably disposed in the cylinder and comprising devices which in part simultaneously operate to convey the material outwardly from an intermediate portion of the cylinder towards the ends of the latter to effect a thorough circulation of the material and the remaining part of said devices operating to simultaneously and uniformly convey the mixed material inwardly towards the central outlet, the outwardly conveying parts of the mixing mechanism being overpowered by the remaining parts of the said mechanism to effect a conveyance of the material to the central outlet.

6. A mixing mechanism having a cylinder with top inlet means and a single centrally located outlet at the bottom thereof, and mixing mechanism in the cylinder comprising devices operable to rotatably and longitudinally circulate the contents of the cylinder towards the outer ends of the latter and having a portion of said devices operating with a greater power than the remaining part of said devices to uniformly and simultaneously reversely convey the cylinder contents to the said outlet from the portions of the cylinder on opposite sides of the said outlet, a part of the mixing and conveying devices being peripherally located and terminating at intervals to break the continuity thereof.

7. A mixing means having a mixing cylinder with top inlet means and a single centrally located bottom outlet, and mixing mechanism comprising intimately associated radial and peripheral spiral devices disposed in groups having a reverse arrangement on opposite sides of the said single outlet and the peripheral devices terminating at intervals to break the continuity thereof and respectively operable in opposition to circulate and convey the contents of the cylinder towards the ends of the latter and also simultaneously and uniformly towards the said outlet from opposite end portions of the cylinder, the devices tending to move the contents of the cylinder inwardly towards the centrally located outlet having a greater conveying power than the remaining devices.

8. A mixing means having a mixing cylinder with inlet means and a single outlet located at a distance from opposite ends of the cylinder, and rotatable mixing mechanism in the cylinder comprising devices distinct groups of peripheral spiral and radial devices opposingly operable and differing in conveying power to respectively convey the contents of the cylinder, also to uniformly and reversely convey the contents towards opposite ends of the latter and towards the single outlet from opposite ends of the cylinder, the peripheral spiral devices terminating at intervals to break the longitudinal continuity thereof.

9. A mixing machine having a cylinder with inlet means and a single outlet located at a distance from opposite ends thereof, and rotatable mixing mechanism in the cylinder comprising groups of similarly constructed reversely arranged peripheral spiral ribbon and radial blade devices on opposite sides of the outlet and operable to uniformly and simultaneously convey the contents of the cylinder from opposite end portions of the latter inwardly to said outlet.

10. A mixing machine having a cylinder with inlet means and a single outlet located at a distance from both ends of the cylinder, and rotatable mixing mechanism in the cylinder comprising skeleton spiral components terminating at intervals to break the continuity thereof and angularly mounted blades disposed in groups having a reverse arrangement of parts at opposite sides of the outlet.

11. A mixing machine having a cylinder with inlet means and a single outlet located at a distance from both ends of the cylinder, rotatable mixing mechanism in the cylinder comprising spiral components and angularly mounted blades disposed in groups in reverse arrangement at opposite sides of the outlet, and adjustable radial devices supporting the said spiral components and blades.

12. A mixing machine having a cylinder with inlet means and an outlet located at a distance from both ends of the cylinder, and rotatable mixing mechanism in the cylinder comprising spiral components terminating at intervals to break the longitudinal continuity thereof and blades angularly mounted relatively to said components and reversely projecting beyond the latter, the spiral components and blades being disposed in groups in reverse arrangement at opposite sides of the outlet.

13. A mixing machine having a cylinder with inlet means and a single outlet located at a distance from both ends of the cylinder, and rotatable mixing mechanism in the cylinder comprising spiral ribbon components and blades angularly disposed in close relation to the said components.

14. A mixing machine having a cylinder with inlet means and a single outlet located at a distance from both ends of the cylinder, and rotatable mixing mechanism in the cylinder comprising a shaft having arms radially extending at right angles therefrom and provided with spiral ribbon components at their outer extremities disposed in groups in reverse arrangement at opposite sides of the outlet.

15. A mixing machine having a cylinder with inlet means and a single outlet located at a distance from both ends of the cylinder, and rotatable mixing mechanism in the cylinder comprising a shaft having radial arms at right angles projecting therefrom and having outer spiral ribbon components attached thereto angularly intersecting each other and terminating at intervals to break the longitudinal continuity thereof and also having blades crossing the said spiral components at angles to the latter.

16. A mixing machine having a cylinder with inlet means and a single outlet located at a distance from both ends of the cylinder, and rotatable mixing mechanism in the cylinder comprising a shaft having radial arms projecting therefrom at angles to each other, spiral ribbon components secured to the outer ends of the arms and having reverse trends and in part terminating relatively to a portion of the arms, and blades adjustably mounted at an angle to the ribbon components on the arms.

17. A mixing machine having a cylinder with inlet means and a single outlet located at a distance from both ends of the cylinder, and rotatable mixing mechanism in the cylinder comprising a shaft having radial arms projecting therefrom at angles to each other, spiral ribbon components secured to the outer ends of the arms and having reverse trends and in part terminating relatively to a portion of the arms, and blades adjustably mounted at an angle to the ribbon components on the arms, the spiral ribbon components and the blades being disposed in groups in reverse arrangement at opposite sides of the outlet.

18. A mixing machine having a cylinder with two centrally disposed top inlets and a single bottom outlet opposite to the inlets and located at a distance from both ends of the cylinder, sifting mechanism disposed on the cylinder and having communication with one of the inlets, a hopper disposed over the remaining inlet, and mixing mechanism in the cylinder operable to convey the contents of the cylinder in reverse outward directions and also to uniformly convey the contents of the latter inwardly to said outlet.

In testimony whereof I have hereunto set my hand in presence of two subscribing witnesses.

CHANDOS R. DIMM.

Witnesses:
M. E. WHITMUS,
PETER T. LINK.